(12) United States Patent
de Jong et al.

(10) Patent No.: US 6,764,221 B1
(45) Date of Patent: Jul. 20, 2004

(54) FLEXIBLE, MULTI-FIBER FIBER OPTIC JUMPER

(75) Inventors: Michael de Jong, Ft. Worth, TX (US); Stuart R. Melton, Hickory, NC (US)

(73) Assignee: Corning Calde Systems LLC, Hickory, NC (US)

( * ) Notice: Subject to any disclaimer, the term of this patent is extended or adjusted under 35 U.S.C. 154(b) by 0 days.

(21) Appl. No.: 10/331,372

(22) Filed: Dec. 30, 2002

(51) Int. Cl.⁷ .................................................. G02B 6/38
(52) U.S. Cl. ........................... 385/55; 385/53; 385/59; 385/60; 385/77; 385/78; 385/139
(58) Field of Search ............................. 385/53, 55, 59, 385/65, 76, 77, 78, 135, 100, 136, 137, 139, 60, 56, 83

(56) References Cited

U.S. PATENT DOCUMENTS

| | | | |
|---|---|---|---|
| 5,548,675 A | * | 8/1996 | Shigematsu et al. .......... 385/80 |
| 5,806,175 A | | 9/1998 | Underwood .................. 29/748 |
| 6,129,865 A | * | 10/2000 | Jeong et al. ................ 264/1.25 |
| 6,295,401 B1 | * | 9/2001 | Rutterman et al. ......... 385/114 |
| 2002/0154867 A1 | * | 10/2002 | Ohtsuka et al. ............... 385/78 |
| 2003/0016918 A1 | * | 1/2003 | Grabbe ........................ 385/78 |
| 2004/0062490 A1 | * | 4/2004 | Gimbel et al. ................ 385/78 |

FOREIGN PATENT DOCUMENTS

| | | | | |
|---|---|---|---|---|
| JP | 6-59157 | * | 6/1994 | ............... 385/53 X |
| JP | P2000-81544 A | * | 3/2000 | .................. 385/53 |

* cited by examiner

*Primary Examiner*—Brian M. Healy (57) ABSTRACT

A flexible multifiber fiber optic jumper is provided with a multifiber ferrule mounted to a first end of optical fibers and at least one ferrule mounted to the second end of the optical fibers. The flexible multifiber fiber optic jumper also has a protective covering over at least a portion of the plurality of optical fibers with the plurality of optical fibers being free to move relative to one another within the protective covering. The flexible multifiber fiber optic jumper may also have a transition boot to bend it through a predetermined angle and a furcation body to allow for multiple connectors at one end.

24 Claims, 6 Drawing Sheets

FLEXIBLE, MULTI-FIBER FIBER OPTIC JUMPER

The present invention relates to a flexible fiber optic jumper, and more particularly, a fiber optic jumper having a plurality of optical fibers that provides a flexible fiber routing management solution for optical networking applications, and a method for assembling the same.

There are several prior art systems including, for example, many different jumpers or patch cords available from a variety of manufacturers. However, the jumpers, which have connectors attached to both ends of the optical fibers, generally contain either single fibers or fiber optic ribbons that have a preferential bend axis and large bend diameter in the non-preferred axis. Due to the potentially large number of single fibers and the preferential bend radius of ribbons, the higher fiber count jumpers are difficult to use in those locations where space is limited. In fact, it may not be possible to use the multifiber jumpers due to space constraints. And, if the jumpers are forced into a particular location, the jumper may be bent beyond the optical fibers' limits, thereby damaging the optical fibers and degrading the signals. Therefore, multiple single fiber jumpers may have to be used, which increases costs and complexity of the routing scheme of the optical fibers.

Additionally, when the jumpers are to be used with active devices, the active devices generally require a high density of optical fibers at the connection points. Thus, the jumpers must have one multifiber ferrule attached to a fiber optic ribbon. The optical fibers are typically connected at the edge of the cards or boards, requiring that the optical fibers approach the cards or boards in either a parallel or perpendicular fashion. Depending on the orientation of the cards or boards, the optical fibers may have to endure twists and possibly sharp turns to appropriately connect with the devices. In small areas, this may be difficult due to the stiffness of the optical fiber ribbons and the inability to bend on a non-preferred bend axis.

Accordingly, the present invention is directed to a flexible multifiber fiber optic jumper that substantially obviates one or more of the problems and disadvantages in the prior art. Additional features and advantages of the invention will be set forth in the description that follows, and in part will be apparent from the description, or may be learned by practice of the invention. The objectives and other advantages of the invention will be realized and attained by the apparatus and process particularly pointed out in the written description and claims, as well as the appended drawings.

SUMMARY OF THE INVENTION

To achieve these and other advantages and in accordance with the purpose of the invention as embodied and broadly described herein, the invention is directed to a flexible multifiber fiber optic jumper comprising a plurality of optical fibers, the plurality of optical fibers having a first end and a second end, a multifiber ferrule mounted to the first end of the plurality of optical fibers, at least one ferrule mounted to the second end of the plurality of optical fibers, and a protective covering over at least a portion of the plurality of optical fibers, the plurality of optical fibers being free to move relative to one another within the protective covering.

In another aspect, the invention provides for a flexible multifiber fiber optic jumper comprising, a length of fiber optic ribbon, the fiber optic ribbon having a plurality of optical fibers, the fiber optic ribbon having a first end, a second end, and an intermediate portion, the fiber optic ribbon also having a ribbon matrix, the intermediate portion of the fiber optic ribbon having the ribbon matrix stripped from the plurality of optical fibers, a multifiber ferrule mounted to the first end of the length of fiber optic ribbon, at least one ferrule mounted to the second end of the fiber optic ribbon, and a protective covering over at least a portion of the fiber optic ribbon, the portion of the fiber optic ribbon including the intermediate portion, and the plurality of optical fibers being free to move relative to one another within the protective covering.

In yet another aspect, the invention is directed to a flexible multifiber fiber optic jumper comprising, a plurality of optical fibers, the plurality of optical fibers having a first end and a second end, a multifiber ferrule mounted to the first end of the plurality of optical fibers, at least two ferrules mounted to the second end of the plurality of optical fibers, a first protective covering over the plurality of optical fibers that extends from the multifiber ferrule to a furcation point, the plurality of optical fibers being free to move relative to one another within the first protective covering, and at least two second protective coverings, each second protective covering covering at least one of the plurality of optical fibers, and each of the at least two second protective coverings extending from the furcation point to the at least two ferrules.

The invention is also directed to a method for assembling a flexible multifiber fiber optic jumper comprising the steps of providing a plurality of bare optical fibers, the plurality of optical fibers having a first end and a second end, connectorizing the first end of the plurality of optical fibers with a multifiber ferrule, disposing a protective covering on at least a portion of the plurality of optical fibers, the protective covering having a configuration to allow the plurality of optical fibers to move relative to one another within the protective covering, and connectorizing the second end of the plurality of fibers.

In another aspect, the invention is directed to a method for assembling a flexible multifiber fiber optic jumper comprising the step of providing a length of fiber optic ribbon, the fiber optic ribbon having a first end, a second end, and an intermediate portion, stripping ribbon matrix off the intermediate portion of the fiber optic ribbon to expose a plurality of optical fibers, disposing a protective covering on the fiber optic ribbon to cover at least a portion of the fiber optic ribbon, the at least a portion of the fiber optic ribbon including the plurality of optical fibers, the protective covering having a configuration to allow the plurality of optical fibers to move relative to one another within the protective covering, connectorizing the first end of the fiber optic ribbon with a multifiber ferrule, and connectorizing the second end of the plurality of the optical fibers.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of the specification. The drawings illustrate several embodiments of the invention and together with the description serve to explain the principles of the invention.

DETAILED DESCRIPTION OF THE INVENTION

Figures 1, 2:
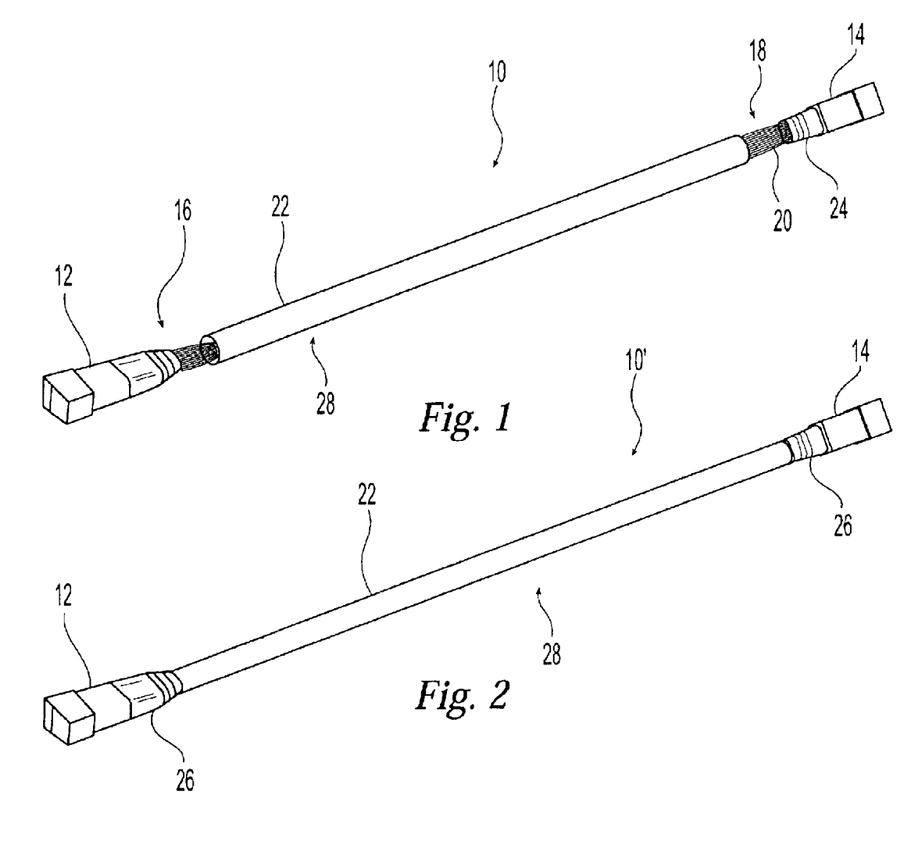
FIG. 1 is a perspective view of one embodiment of a flexible multifiber fiber optic jumper according to the present invention.
FIG. 2 is a perspective view of another embodiment of a flexible multifiber fiber optic jumper according to the present invention.

FIG. 1 illustrates one embodiment of a flexible multifiber fiber optic jumper 10 according to the present invention. The flexible multifiber fiber optic jumper 10 has connectors 12, 14 at the first end 16 and second end 18, respectively, of a plurality of optical fibers 20. A protective covering 22 covers the optical fibers 20. Connectors 12,14 are illustrated as MTP connectors, but could be of any multifiber type, e.g., MPO/MTP, mini MPO, MTRJ, and MPX connectors. It is also possible that the connectors as used herein be a reduced piece connector, or even, in the appropriate location and under appropriate conditions, simply just a ferrule.

As illustrated, the connectors 12,14 have strain relief boots 24 that are common in the industry. That is, they typically have an oval or oblong configuration to accommodate fiber optic ribbons. While the optical fibers are seen between the protective covering 22 and strain relief boots 24 in FIG. 1, the protective covering 22 may abut the strain relief boot 24 to cover the entirety of the optical fibers 20. Alternatively, the protective covering 22 may only cover a portion of the optical fibers 20 between the connectors 12,14. As an alternative to the strain relief boot 24, the connectors 12,14 on flexible multifiber fiber optic jumper 10', as shown in FIG. 2, may also have a transition boot 26, which has a more round configuration to allow the protective covering 22 to fit between the transition boot 26 and the optical fibers 20. This configuration allows for more protection of the optical fibers 20 than the previous embodiment since the optical fibers are completely covered. Additionally, one must be careful if the protective covering 22 covers only a portion of the optical fibers 20 as the ends of the protective covering 22 provides a potential bending surface.

It should be noted that the plurality of optical fibers 20, as used herein, refers to optical fibers that have a diameter of about 250 microns. As known in the industry, the optical fibers 20 have a coating to protect the optical fibers 20. This coating is usually colored with one of twelve standard colors: Blue, Orange, Green Brown, Slate, White, Red, Black, Yellow, Violet, Rose, and Aqua. The colors are used in the above-order to identify specific fibers when the optical fibers are ribbonized. In this manner, it is easy to identify the optical fibers at the end of a long jumper or cable when the optical fiber ribbon may have been twisted. The protective covering 22 is a covering for the optical fibers 20 that is in addition to the protective coating noted above. Typically, the protective covering 22 is similar to the 900 micron sheath that is often used to upjacket single optical fibers and through which the optical fibers can easily pass. However, for this application, the tubing is preferably larger, i.e., has an inside diameter sized to accommodate the number of fibers to be covered and a wall thickness to provide the required level of protection to the fibers. The protective covering is preferably a tubular structure made of a Teflon or polyester material.

Figure 3:
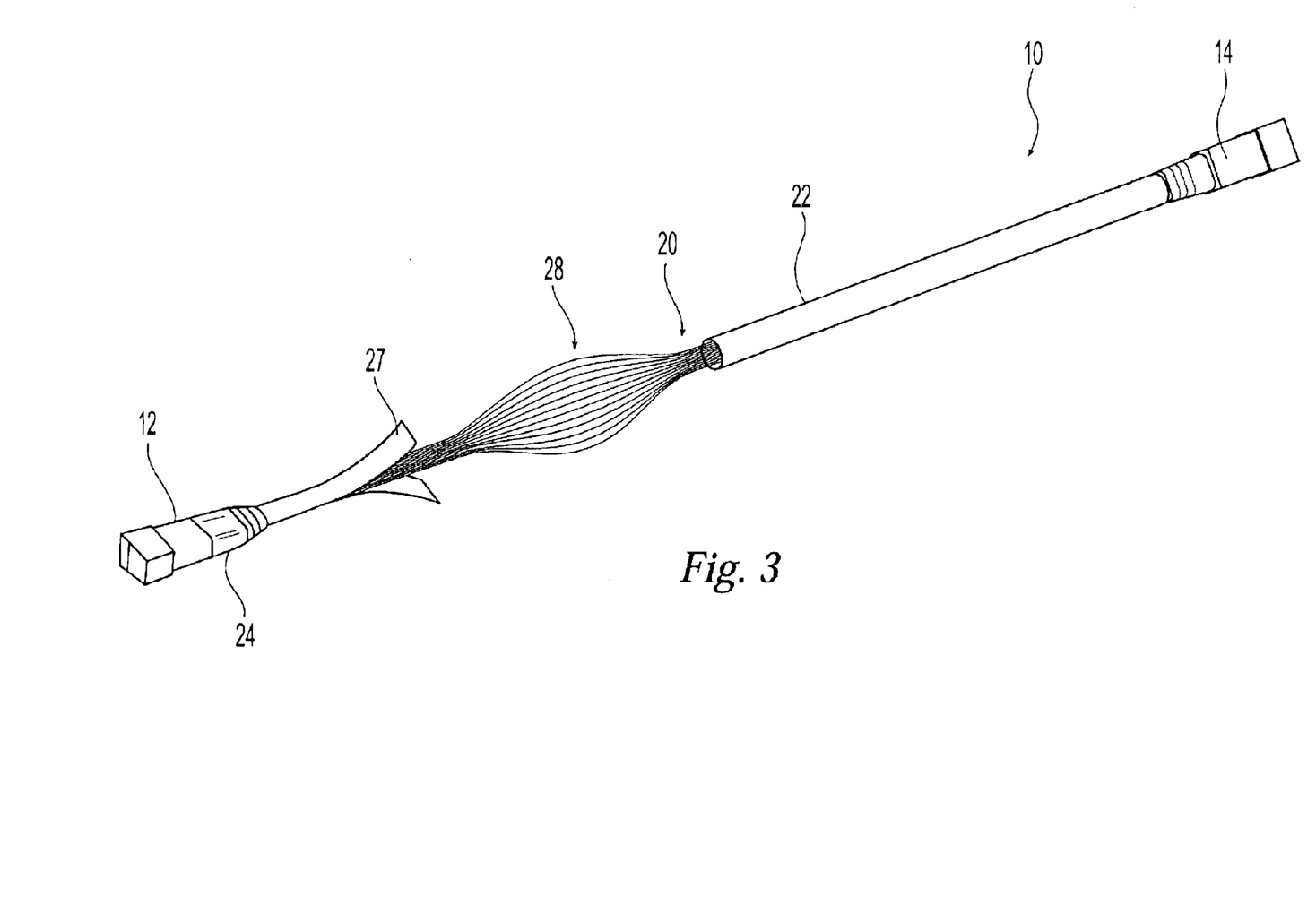
FIG. 3 is a perspective view of the flexible multifiber fiber optic jumper of FIG. 1 in a partial state of construction.

The plurality of optical fibers 20 used in the flexible multifiber fiber optic jumper 10 may start in a ribbon form or as a plurality of loose optical fibers. However, regardless of the form in which the optical fibers 20 start, they both preferably have ribbonized ends 16,18 with loose optical fibers in the center portion 28 of flexible, multifiber fiber optic jumper 10. As can be seen in FIG. 3, the plurality of optical fibers 20 are separated from one another in center portion 28, allowing the optical fibers to move independently of one another within the protective covering 22. If the optical fibers 20 begin as a ribbon, then the ribbon matrix material 27 is peeled away from the optical fibers 20 in the center portion 28 to allow the independent movement of the optical fibers 20. However, it is preferable to leave the ribbon matrix material 27 (not shown in all figures for clarity) at the ends 16,18 of the optical fibers for easier insertion of the optical fibers into a multifiber ferrule. If one of the ends 16,18 is to be connectorized with either single fiber ferrules or several multifiber ferrules, then the matrix material 27 can be removed as the user desires to assist in the insertion of the optical fibers into the ferrules.

To assemble the flexible multifiber fiber optic jumper 10 as illustrated in FIG. 1, a fiber optic ribbon has its first and second ends 16,18 prepared for mounting on a multifiber connector 12. The end preparation preferably includes stripping the ribbon matrix and any fiber coating from the optical fibers. The ferrule is then attached to the optical fibers at the first end 16 as is known in the art. The matrix material is then stripped from the central portion 28 of the optical fibers before the protective covering 22 is disposed over the optical fibers 20. If the ferrule is attached at the second end before the protective covering 22 is disposed over the optical fibers 20, then the protective covering 22 would have to be relatively large in diameter to fit over the ferrules. In an environment where space is a main consideration, the smaller the protective covering 22, the better. The protective covering 22 should also be relatively flexible to allow the jumper 10 to be used in a variety of situations and routing schemes. It should also protect the optical fibers from damage when hit, pulled through hardware and ducts, etc. While a cylindrical sheath is illustrated in the figures, the protective covering 22 could be of any shape or even have a opening along its length to allow the protective covering 22 to be installed or removed at a later date. It is also within the scope of this invention to color the protective covering 22 with a variety of colors, markings, or other indicia to allow users to identify the jumpers. Once the protective covering 22 is on the jumper 10, the second end 18 is prepared and connectorized.

Figure 4:
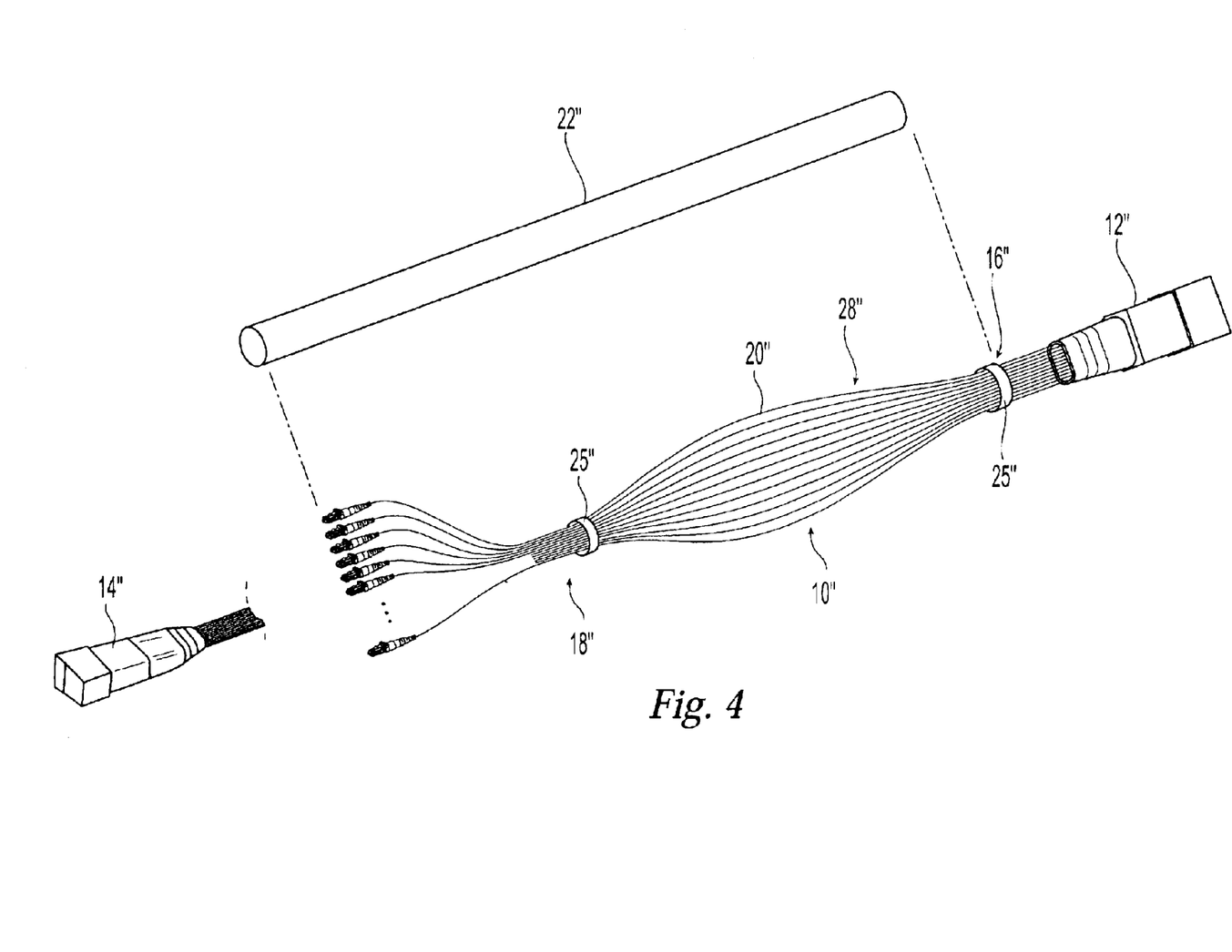
FIG. 4 is a perspective view of another embodiment of a flexible multifiber fiber optic jumper according to the present invention.

Another embodiment of a flexible, multifiber fiber optic jumper 10" is illustrated in FIG. 4 that uses a plurality of loose optical fibers 20". The optical fibers 20" are ribbonized at one end 16" for easy insertion into a multifiber connector 12" with a multifiber ferrule, which is depicted in this figure as a 24 fiber connector. Depending on the configuration and bow many ferrules are to be mounted on the other end 18", the optical fibers 20" may or may not be ribbonized at the second end 18". However, if both ends are to be ribbonized, it is preferable to slide the protective covering 22" over the fibers before the second end is ribbonized, to allow for as small a diameter protective covering 22" as possible. As shown in FIG. 4 and further demonstrated in U.S. Pat. No. 5,160,569, the contents of which are incorporated herein by reference, tape, or a UV curing adhesive 25" can be used to ribbonized the optical fibers at the ends 16",18". In either case, the center portion 28" of the flexible multifiber fiber optic jumper 10" will not be ribbonized so the optical fibers 20" are free to move relative to one another in the protective covering 22". If the second end 18" is to have a plurality of connectors or ferrules installed, then the optical fibers would not be ribbonized at all. As can be seen in FIG. 4, a plurality of connectors are illustrated on the ends of the optical fibers 20" (a reduced number of optical fibers 20" are illustrated for clarity reasons). While MTRJ connectors, which have typically two or four fiber ferrules, are illustrated, any type or configuration of connectors may be used. To this end, an MTP connector 14" is also illustrated as a possible termination solution. As noted below, if a plurality of connectors or ferrules are to be installed at the second end 18", then a furcation body, heat shrink, etc., may be used to help secure the second end 18".

Figure 5:
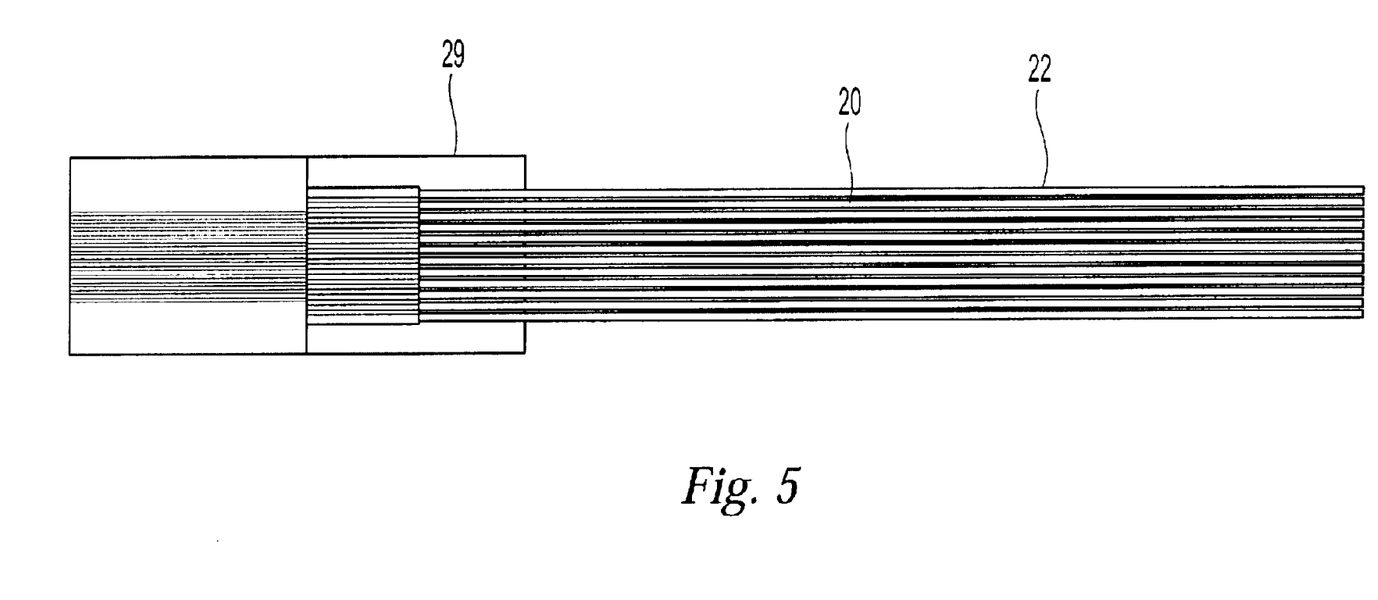
FIG. 5 illustrates a v-groove array to be used with the present invention.

It is also within the scope of this invention that at least one end of the flexible multifiber fiber optic jumper 10,10',10" has a v-groove array 29 attached. Such a v-groove array 29 is illustrated in FIG. 5 and is attached as is known by one of ordinary skill in the art. Such a v-groove array is typically used in place of a ferrule to align multiple optical fibers with certain photonic devices such as switch fabrics, lens arrays, and optical chips.

Figure 6:
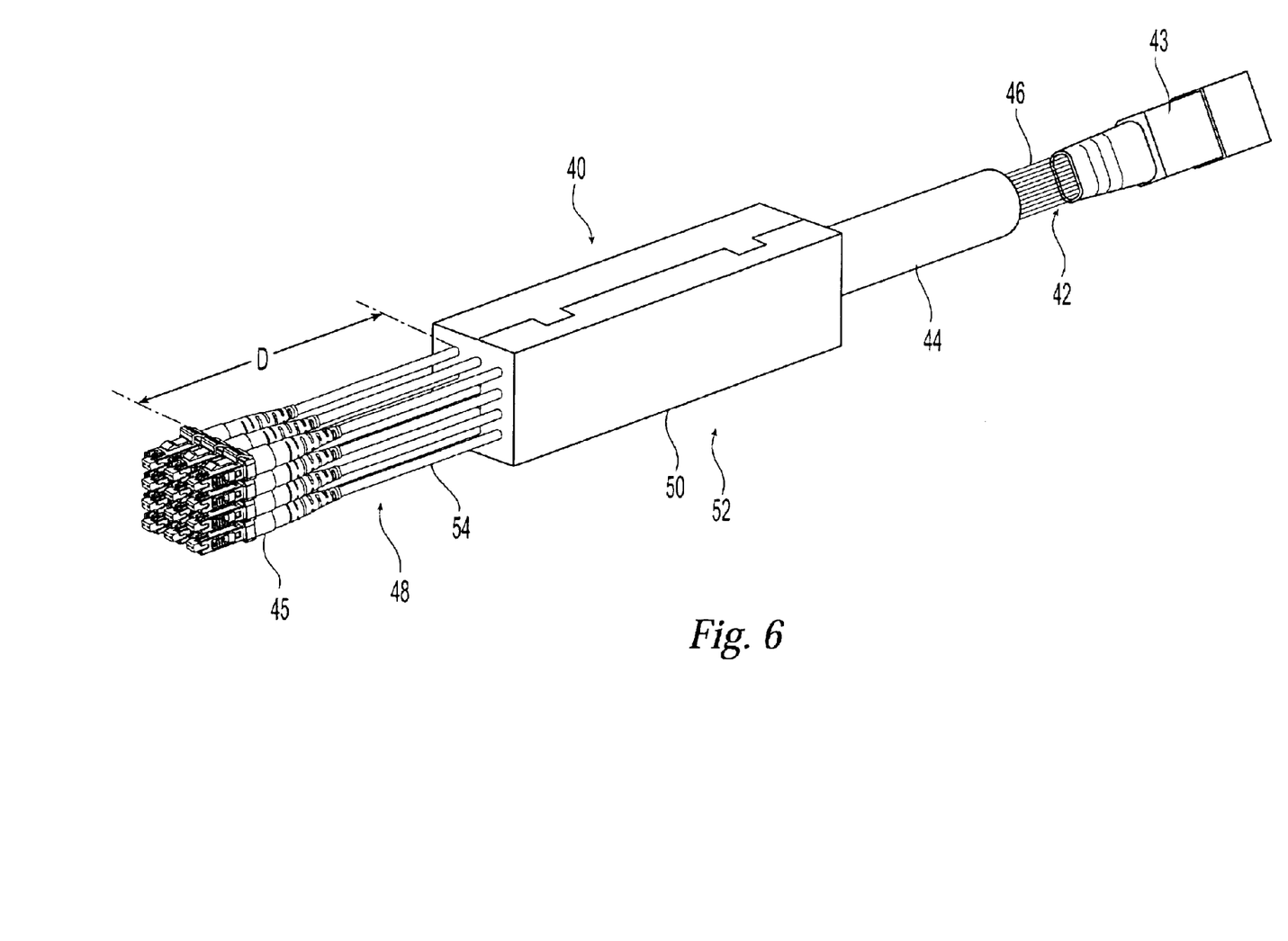
FIG. 6 illustrates another embodiment of a flexible multifiber fiber optic jumper according to the present invention.

Another embodiment of a flexible multifiber fiber optic jumper 40 is illustrated in FIG. 6. In this embodiment, the first end 42 is similar to that of the flexible multifiber fiber optic jumpers 10,10',10", but may include more or fewer optical fibers than the previous embodiments. For example, a 24 fiber connector 43 is illustrated at end 42. The flexible multifiber fiber optic jumper 40 also has a protective covering 44 covering at least a portion of the optical fibers 46 extending from the first end 42. However, at a predetermined distance D from the second end 48 is a furcation body 50 to furcate optical fibers 46 at a furcation point 52. As can be seen, the optical fibers 46 that exit from the furcation body 50 on the second end 48 have a second protective covering 54 that has an end encapsulated within the furcation body 50 and extends toward the second end 48. The optical fibers 46 are terminated with an appropriate connector or ferrule, such as the MTRJ connector, as shown, or the LC, etc., depending on the number of ferrules needed, fibers to be terminated, and the application. In this embodiment, several of the optical fibers could be protected by a single second protective covering 54 and be terminated in a multifiber ferrule as discussed above. The furcation body 50 is preferably as injection molded plastic body with extruded tubing and is available from the assignee of the present invention as part number RIB-FAN-12. However, it is also possible to use other furcation methods, including, for example, a heat shrink material, an epoxy plug, a small splice tray, etc., at the furcation point 52. The second protective covering 54, as with some of the other embodiments extend from the furcation body 50 to the connectors, but could extend along only a portion of the optical fibers 46.

Figure 7:
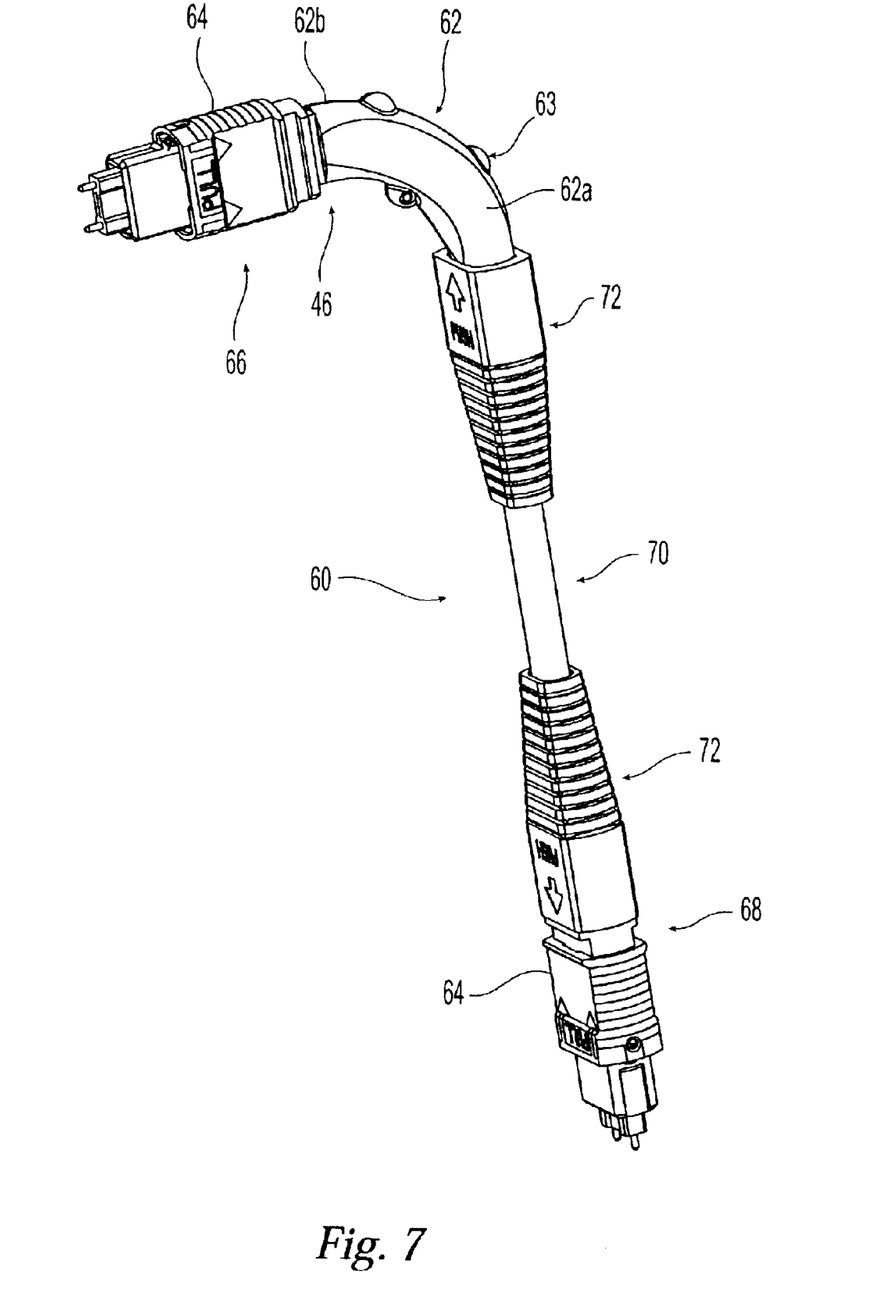
FIG. 7 is a perspective view of another embodiment of a flexible multifiber fiber optic jumper according to the present invention.

FIG. 7 illustrates a flexible multifiber fiber optic jumper 60 with a 90° transition boot 62. The flexible multifiber fiber optic jumper 60 is similar to the other flexible multifiber fiber optic jumpers 10,10',10" except for the 90° transition boot 62. The multifiber fiber optic jumper 60 is illustrated with a multifiber connector 64 on each end 66,68 and a protective covering 70 that extends between the connectors 64. The optical fibers (not visible in this figure) are similarly loose and move independently relative to one another within the protective coverings 70.

The transition boot 62 replaces what would be the spring push element in the MTP connector. The crimp ring (not visible) and the strain relief boot 72 are then pushed over the transition boot 62 to complete the connector. In the pictured embodiment, the transition boot 62 has two halves 62a and 62b that are aligned and secured to one another with pins and sockets 63. However, the transition boot 62 could be made in any configuration and of any number of pieces, and be secured in any manner and still come within the scope of the invention. Similarly, while the illustrated embodiment of the transition boot 62 bends through about 90°, it could bend through an angle that is greater or smaller.

It will be apparent to those skilled in the art that various modifications and variations can be made in the flexible multifiber fiber optic jumper of the present invention without departing from the spirit or scope of the invention. Thus, it is intended that the present invention cover the modifications and variations of this invention provided they come within the scope of the appended claims and their equivalents.

We claim:

1. A flexible multifiber fiber optic jumper comprising:
    a plurality of optical fibers, the plurality of optical fibers having a first end and a second end;
    a multifiber ferrule mounted to the first end of the plurality of optical fibers;
    at least one ferrule mounted to the second end of the plurality of optical fibers; and
    a protective covering over at least a portion of the plurality of optical fibers, the plurality of optical fibers being free to move relative to one another within the protective covering.

2. The flexible multifiber fiber optic jumper of claim 1, wherein the at least one ferrule mounted to the second end of the plurality of fibers is a multifiber ferrule.

3. The flexible multifiber fiber optic jumper of claim 1, wherein the at least one ferrule mounted to the second end of the plurality of fibers is a plurality of multifiber ferrules.

4. The flexible multifiber fiber optic jumper of claim 1, wherein the multifiber ferrule mounted to the first end of the plurality of fibers is a v-grove array.

5. The flexible multifiber fiber optic jumper of claim 1, wherein the at least one ferrule comprises a plurality of single fiber ferrules, one of the plurality of single fiber ferrules mounted to each of the plurality of optical fibers.

6. The flexible multifiber fiber optic jumper of claim 2, wherein each of the multifiber ferrules have a plurality of microholes that correspond to the plurality of optical fibers.

7. The flexible multifiber fiber optic jumper of claim 1, wherein a portion of the first end of the plurality of optical fibers is ribbonized.

8. The flexible multifiber fiber optic jumper of claim 2, wherein a portion of the first and second ends of the plurality of optical fibers are ribbonized.

9. The flexible multifiber fiber optic jumper of claim 1, further comprising a transition boot engaging a portion of the multifiber ferrule and a portion of the protective covering.

10. The flexible multifiber fiber optic jumper of claim 9, wherein the transition boot bends through an angle of about 90°.

11. The flexible multifiber fiber optic jumper of claim 1, wherein the protective covering is round in cross section.

12. A flexible multifiber fiber optic jumper comprising:
    a length of fiber optic ribbon, the fiber optic ribbon having a plurality of optical fibers, the fiber optic ribbon having a first end, a second end, and an intermediate portion, the fiber optic ribbon also having a ribbon matrix;

the intermediate portion of the fiber optic ribbon having the ribbon matrix stripped from the plurality of optical fibers;

a multifiber ferrule mounted to the first end of the length of fiber optic ribbon;

at least one ferrule mounted to the second end of the fiber optic ribbon; and a protective covering over at least a portion of the fiber optic ribbon, the portion of the fiber optic ribbon including the intermediate portion, and the plurality of optical fibers being free to move relative to one another within the protective covering.

13. The flexible multifiber fiber optic jumper of claim 12, wherein the at least one ferrule mounted to the second end of the fiber optic ribbon is a multifiber ferrule.

14. The flexible multifiber fiber optic jumper of claim 12, wherein the ribbon matrix is stripped from the second end of the fiber optic ribbon and at least one fete comprises at least two ferrules mounted to the fibers at the second end.

15. The flexible multifiber fiber optic jumper of claim 12, further comprising a transition boot attached to a portion of the multifiber ferrule and a portion of the protective covering.

16. A flexible multifiber fiber optic jumper comprising:

a plurality of optical fibers, the plurality of optical fibers having a first end and a second end;

a multifiber ferrule mounted to the first end of the plurality of optical fibers;

at least two ferrules mounted to the second end of the plurality of optical fibers;

a first protective covering over the plurality of optical fibers that extends from the multifiber ferrule to a furcation point, the plurality of optical fibers being free to move relative to one another within the first protective covering; and at least two second protective coverings, each second protective covering covering at least one of the plurality of optical fibers, and each of the at least two second protective coverings extending from the furcation point to the at least two ferrules.

17. The flexible multifiber fiber optic jumper of claim 16, wherein at least a portion of the first end of the plurality of optical fibers is ribbonized.

18. The flexible multifiber fiber optic jumper of claim 16, further comprising a furcation body disposed at the furcation point.

19. The flexible multifiber fiber optic jumper of claim 16, wherein the at least two second protective coverings comprise a plurality of second protective coverings, each of the plurality of second protective coverings covering at least one of the plurality of optical fibers between the furcation point and the ferrule.

20. A method for assembling a flexible multifiber fiber optic jumper comprising the steps of:

providing a plurality of bare optical fibers, the plurality of optical fibers having a first end and a second end;

connectorizing the first end of the plurality of optical fibers with a multifiber ferrule;

disposing a protective covering on at least a portion of the plurality of optical fibers, the protective covering having a configuration to allow the plurality of optical fibers to move relative to one another within the protective covering; and connectorizing the second end of the plurality of fibers.

21. The method for assembling a flexible multifiber fiber optic jumper of claim 20, where in the step of disposing the protective covering occurs before the step of connectorizing the first end of the plurality of optical fibers.

22. A method for assembling a flexible multifiber fiber optic jumper comprising the steps of:

providing a length of fiber optic ribbon, the fiber optic ribbon having a first end, a second end, and an intermediate portion;

stripping ribbon matrix off the intermediate portion of the fiber optic ribbon to expose a plurality of optical fibers;

disposing a protective covering on the fiber optic ribbon to cover at least a portion of the fiber optic ribbon, the at least a portion of the fiber optic ribbon including the plurality of optical fibers, the protective covering having a configuration to allow the plurality of optical fibers to move relative to one another within the protective covering;

connectorizing the first end of the fiber optic ribbon with a multifiber ferrule; and connectorizing the second end of the plurality of the optical fibers.

23. The method for assembling a flexible multifiber fiber optic jumper of claim 22, further comprising the step of stripping ribbon matrix off the second end before the step of disposing the protective covering on the fiber optic ribbon.

24. The method for assembling a flexible multifiber fiber optic jumper of claim 22, wherein the fiber optic ribbon has a predetermined width and the protective covering has a diameter that is smaller than the predetermined width.

* * * * *

UNITED STATES PATENT AND TRADEMARK OFFICE
CERTIFICATE OF CORRECTION

PATENT NO.     : 6,764,221 B1
DATED          : July 20, 2004
INVENTOR(S)    : de Jong et al.

It is certified that error appears in the above-identified patent and that said Letters Patent is hereby corrected as shown below:

Title page,
Item [73], Assignee, replace the word "Calde" with -- Cable --

Signed and Sealed this

Sixteenth Day of November, 2004

JON W. DUDAS
*Director of the United States Patent and Trademark Office*